(12) United States Patent
Friedrich et al.

(10) Patent No.: US 12,479,512 B2
(45) Date of Patent: Nov. 25, 2025

(54) FRONT VEHICLE MODULE, AND VEHICLE COMPRISING A FRONT VEHICLE MODULE

(71) Applicant: HBPO GmbH, Lippstadt (DE)

(72) Inventors: Jonathan Friedrich, Wickede (DE); Daniel Knorr, Bielefeld (DE); Tobias Tegethoff, Lichtenau (DE)

(73) Assignee: HBPO GmbH, Lippstadt (DE)

( * ) Notice: Subject to any disclaimer, the term of this patent is extended or adjusted under 35 U.S.C. 154(b) by 408 days.

(21) Appl. No.: 18/250,844

(22) PCT Filed: Oct. 28, 2021

(86) PCT No.: PCT/EP2021/079944
§ 371 (c)(1),
(2) Date: Apr. 27, 2023

(87) PCT Pub. No.: WO2022/090375
PCT Pub. Date: May 5, 2022

(65) Prior Publication Data
US 2023/0406414 A1     Dec. 21, 2023

(30) Foreign Application Priority Data
Oct. 30, 2020   (DE) .......................... 102020128579.5

(51) Int. Cl.
*B60R 5/02*        (2006.01)
*B60L 53/18*       (2019.01)
(Continued)

(52) U.S. Cl.
CPC ............ *B62D 25/087* (2013.01); *B60L 53/18* (2019.02); *B60R 5/02* (2013.01); *B62D 29/004* (2013.01);
(Continued)

(58) Field of Classification Search
CPC .... B62D 25/087; B62D 25/085; B62D 25/08; B60R 5/02; B60R 2011/0036; B60L 53/18; B60L 53/16
(Continued)

(56) References Cited

U.S. PATENT DOCUMENTS 6,276,477 B1    8/2001  Ida
6,698,822 B2    3/2004  Porsche
(Continued)

FOREIGN PATENT DOCUMENTS

DE    102019200892 A1    7/2019
EP       2520476 A2     11/2012
(Continued)

OTHER PUBLICATIONS

English translation of DE102019200892A1; https://translatinportal.epo.org; Jul. 28, 2025 (Year: 2025).*
(Continued)

*Primary Examiner* — Roger L Pang
(74) *Attorney, Agent, or Firm* — Laurence P. Colton; Smith Tempel Blaha LLC (57) ABSTRACT

A vehicle front module having a loading compartment cavity with a receiving area for loading objects, in particular luggage. The loading compartment cavity has an opening, a base, and a wall arranged between the opening and the base. A front reinforcement structure which extends in a transverse direction transversely to the drive direction is installed on the loading compartment cavity, preferably molded thereon, on the face of the loading compartment cavity positioned at the front in the drive direction. Furthermore, the wall additionally has at least one lateral reinforcement structure, which is connected to the wall or is molded thereon and which differs from the front reinforcement
(Continued)

structure, at least on faces of the loading compartment cavity lying opposite one another in the transverse direction.

14 Claims, 8 Drawing Sheets

(51) Int. Cl.
*B62D 25/08* (2006.01)
*B62D 29/00* (2006.01)
*B62D 29/04* (2006.01)
*B60N 3/10* (2006.01)
*B60R 11/00* (2006.01)

(52) U.S. Cl.
CPC ............ *B62D 29/043* (2013.01); *B60N 3/104* (2013.01); *B60R 2011/0036* (2013.01); *B62D 25/085* (2013.01)

(58) Field of Classification Search
USPC ................. 296/37.1, 187.09, 203.02, 193.09
See application file for complete search history.

(56) References Cited

U.S. PATENT DOCUMENTS

| | | | |
|---|---|---|---|
| 9,527,450 B1* | 12/2016 | Bellis | B62D 25/082 |
| 10,173,739 B2 | 1/2019 | Bellis et al. | |
| 11,214,185 B2* | 1/2022 | Qiu | B60K 1/04 |
| 2001/0020796 A1* | 9/2001 | Delavalle | B62D 25/087 |
| | | | 296/193.04 |
| 2020/0262482 A1 | 8/2020 | Makowski | |
| 2021/0114525 A1* | 4/2021 | Mazzarella | B32B 3/266 |
| 2022/0185192 A1* | 6/2022 | Gill | B60R 11/06 |

FOREIGN PATENT DOCUMENTS

| | | |
|---|---|---|
| JP | 2010052729 A | 3/2010 |
| WO | 2006011057 A1 | 2/2006 |

OTHER PUBLICATIONS

DE102016224160A1 with English translation; Redeker; Jun. 7, 2018 (Year: 2025).*
WIPO, International Search Report (in a corresponding application), Apr. 14, 2022.

* cited by examiner

Fig. 3

FRONT VEHICLE MODULE, AND VEHICLE COMPRISING A FRONT VEHICLE MODULE

CROSS REFERENCE TO RELATED APPLICATIONS

This application is the US National Phase of and claims the benefit of and priority on International Application No. PCT/EP2021/079944 having a filing date of 28 Oct. 2021, which claims priority on and the benefit of German Patent Application No. 10 2020 128 579.5 having a filing date of 30 Oct. 2020.

BACKGROUND OF THE INVENTION

Technical Field

The invention relates to a vehicle front module having a loading compartment cavity with a receiving area for loading objects, and to a vehicle having such a vehicle front module.

Prior Art

For the final assembly of complex technical products, modular designs have become established to simplify the final assembly. Individual modules are preassembled, usually by suppliers, such that only a small number of parts have to be assembled during the final assembly. This is a common manufacturing method in vehicle production today.

In vehicles with an electric motor drive, the drive motor is generally significantly smaller than a corresponding internal combustion engine of the same power. Occasionally, the motor is arranged close to the drive axle or directly on the drive axle. This results in free space, in particular in the front region of a vehicle, which can be used differently.

U.S. Pat. No. 9,527,450 B1 describes, like U.S. Pat. No. 10,173,739 B2, a vehicle end module in which the free space, which is produced in particular by reducing the space claimed by the drive in electric vehicles, is equipped with a loading compartment shell. In this case, the loading compartment shell is designed such that it can be fastened to different elements of an end module, and contributes to a greater stability of the end module. The vehicle end module is mounted as a unit to the vehicle center part.

Since, in the case of an electrically operated vehicle, no (large) engine compartment is necessary, the front vehicle can be made smaller—more precisely, shortened—such that the vehicle can be constructed in a more compact manner overall. The occupants on the front seats are arranged further forward in the vehicle. However, this in turn reduces the size of the region for the crush zone of the vehicle, thereby reducing the safety of the occupants at least indirectly.

BRIEF SUMMARY OF THE INVENTION

The object of the invention is to develop a vehicle front module which reduces the mentioned disadvantages and/or increases the safety of the occupants.

The object is achieved by a vehicle front module having a loading compartment cavity with a receiving area for loading objects, in particular luggage, wherein the loading compartment cavity has an opening, a base, and a wall arranged between the opening and the base, wherein a front reinforcement structure which extends in a transverse direction transversely to the drive direction is installed on the loading compartment cavity, preferably molded thereon, on the face of the loading compartment cavity positioned at the front in the drive direction, wherein the wall additionally has at least one lateral reinforcement structure, which is connected to the wall or is molded thereon and which differs from the front reinforcement structure, at least on the faces of the loading compartment cavity lying opposite one another in the transverse direction and/or having a loading compartment cavity having a receiving area for loading objects, in particular luggage, wherein the loading compartment has an opening, a base, and a wall arranged between the opening and the base, characterized in that a cable drum with a charging cable that can be wound thereon is arranged in the base region of the loading compartment cavity, and by a vehicle having a having a vehicle structure and a vehicle front module, which is connected to the vehicle structure as taught herein.

According to the invention, a vehicle front module is provided which has a loading compartment cavity with a receiving area for loading objects. The loading compartment cavity has an opening, a base and a wall arranged between the opening and the base. The loading objects can in particular be luggage. In the subject matter of the invention, a front reinforcement structure which extends in a transverse direction transversely to the drive direction is installed on the loading compartment cavity on the front end with respect to the drive direction. Preferably, this reinforcement structure is molded onto the same. Furthermore, the wall also has, at least on sides of the loading compartment cavity which are opposite in the transverse direction, at least one lateral reinforcement structure which is connected to the wall or is molded thereon and which is different from the front reinforcement structure. As a result of the introduction of reinforcement structures into/onto the loading compartment cavity, the loading compartment cavity is stiffened, and thus forms an element that, in the event of an impact of the vehicle, can absorb energy for deformation and can thus increase the safety of the occupants, although the available space has been reduced compared to "conventional" vehicles.

It has been found to be advantageous that the lateral reinforcement structure extends over a substantial part of the portions of the wall of the loading compartment cavity that are opposite in the transverse direction. In this case, the quantity of the energy that can be absorbed is maximal when the energy input which leads to deformation occurs at the front.

In a preferred embodiment of the vehicle front module according to the invention, the front reinforcement structure is designed as a cross member, in particular a front lock carrier of a mounting support. As such, the desired reinforcement could be used simultaneously as a functional element of the vehicle front module, such that the number of module elements could be reduced, which in turn can lead to savings of both space and cost during assembly.

In a particularly preferred embodiment, a front portion of the lateral reinforcement structure in the drive direction is designed as a lateral beam of a mounting support and is connected to the front reinforcement structure. As such, the loading compartment cavity can assume several functions of the vehicle front module. In this embodiment, the reinforcement structure additionally assumes the function of the lateral beams and reduces the number of components of the vehicle front module.

It has also been found to be advantageous for the lateral reinforcement structure to be connected to the second reinforcement structure below the first reinforcement structure as viewed in the vertical direction, in particular via crash boxes.

The object is also achieved by a vehicle front module that has a loading compartment cavity with a receiving area for loading objects, in particular luggage, wherein the loading compartment has an opening, a base and a wall arranged between the opening and the base. In this case, it is quite conceivable, furthermore, that the vehicle front module has at least one additional feature to the features described above. Furthermore, in the vehicle front module according to the invention, a cable drum with a charging cable that can be wound thereon is arranged in the base region of the loading compartment cavity. Especially in cities, the parking spaces in front of charging columns are often occupied, even though a charging process is not taking place. If an electric vehicle is then parked next to the actual parking space, it is frequently the case that the charging cable of the charging station is not long enough to be able to carry out a charging operation. If the electric vehicle itself has a pull-out charging cable, the vehicle can be charged even if it is not parked in the parking space provided for this purpose.

It has proven advantageous for the vehicle front module to have a charging cable guide which is arranged at least partially on the front side of the loading compartment cavity in the drive direction, and by means of which the charging cable is guided from the base region of the loading compartment cavity to the front side of the loading compartment cavity in the drive direction. The charging cable can thus be removed from the outside, and it is not necessary for a user to open the loading compartment and remove the cable. The advantage is increased if the loading compartment is filled and thus access to the charging cable would only be possible by a partial emptying of the loading compartment.

It is of particular advantage if the vehicle front module comprises a cooler device. Particularly in the domain of leisure activities, it is more and more common to bring along food or other goods which need to be cooled. An installed cooler can be adapted to the given dimensions, and thus can be arranged in a space-saving and reliable manner.

In a preferred embodiment, the loading compartment cavity is formed from a plastics material, in particular from a plastics material filled with glass fibers or continuous glass fibers. The loading compartment can thus easily be adapted to the available space, wherein the use of glass fibers allows a robust and nevertheless lightweight construction of the loading compartment cavity.

It has proven particularly preferable for the plastics material to be structurally reinforced with metallic elements, in particular embedded sheets. On the one hand, the metallic elements increase the rigidity of the loading compartment module; on the other hand, the connection to other elements of the vehicle front module is simplified by cutting a thread into the embedded sheets to which a different element of the vehicle front module is screwed. Particularly preferred is a vehicle front module in which the metallic elements are connected to the plastics material of the loading compartment cavity by injection molding, in particular through or around them, or are subsequently installed on the loading compartment cavity.

The object is also achieved by a vehicle having a vehicle structure and a vehicle front module connected to the vehicle structure, wherein the vehicle front module corresponds to an embodiment described above.

BRIEF DESCRIPTION OF THE DRAWINGS

The invention will be explained in more detail below with reference to exemplary embodiments.

DETAILED DESCRIPTION OF PREFERRED EMBODIMENTS

Figure 1:
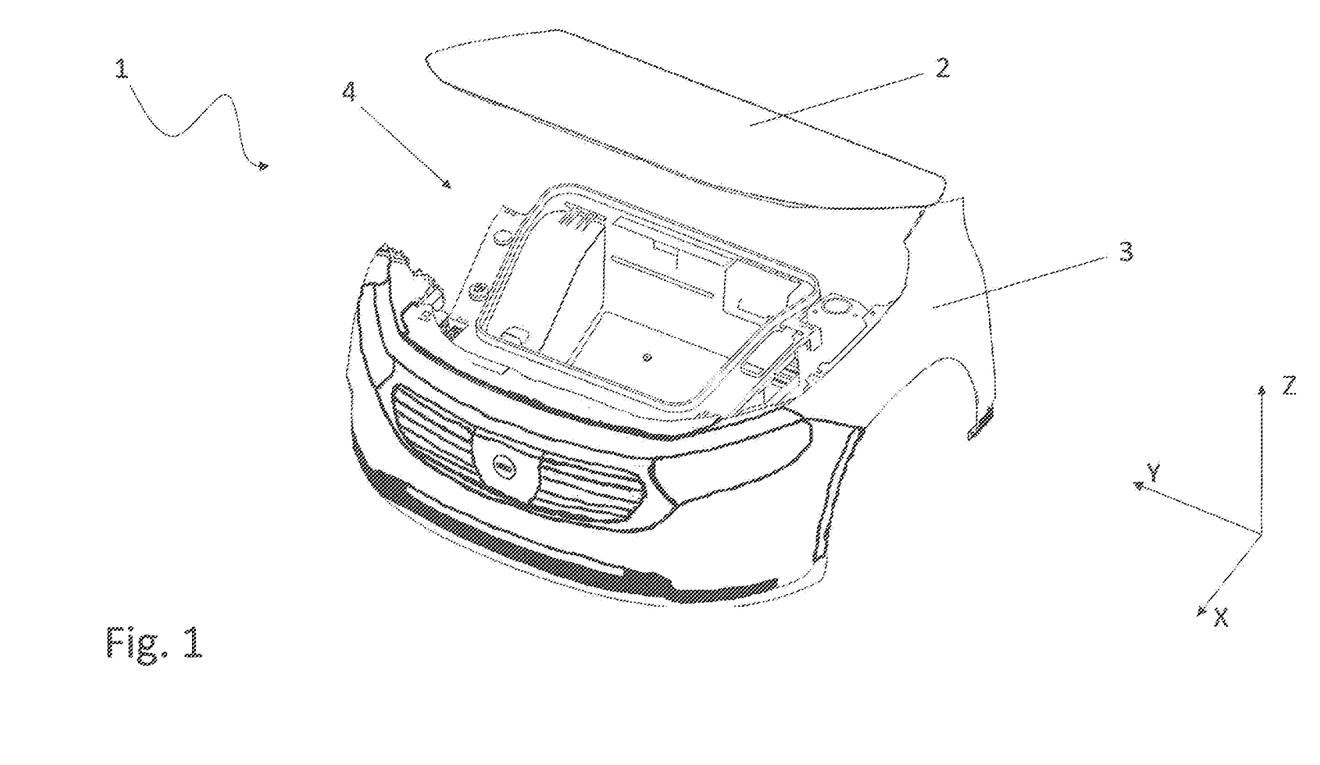
FIG. 1 is the front part of a vehicle with a vehicle front module according to the invention.

FIG. 1 is a partial view of a vehicle 1 in which the front part is shown. The left front fender 3 on which the vehicle front module 4 is arranged is schematically illustrated. The hood 2 is shown in the open state above the vehicle front module 4. The vehicle front module 4 shown here consists of a bumper, a grill, the headlights, and a loading compartment cavity.

Figure 2:
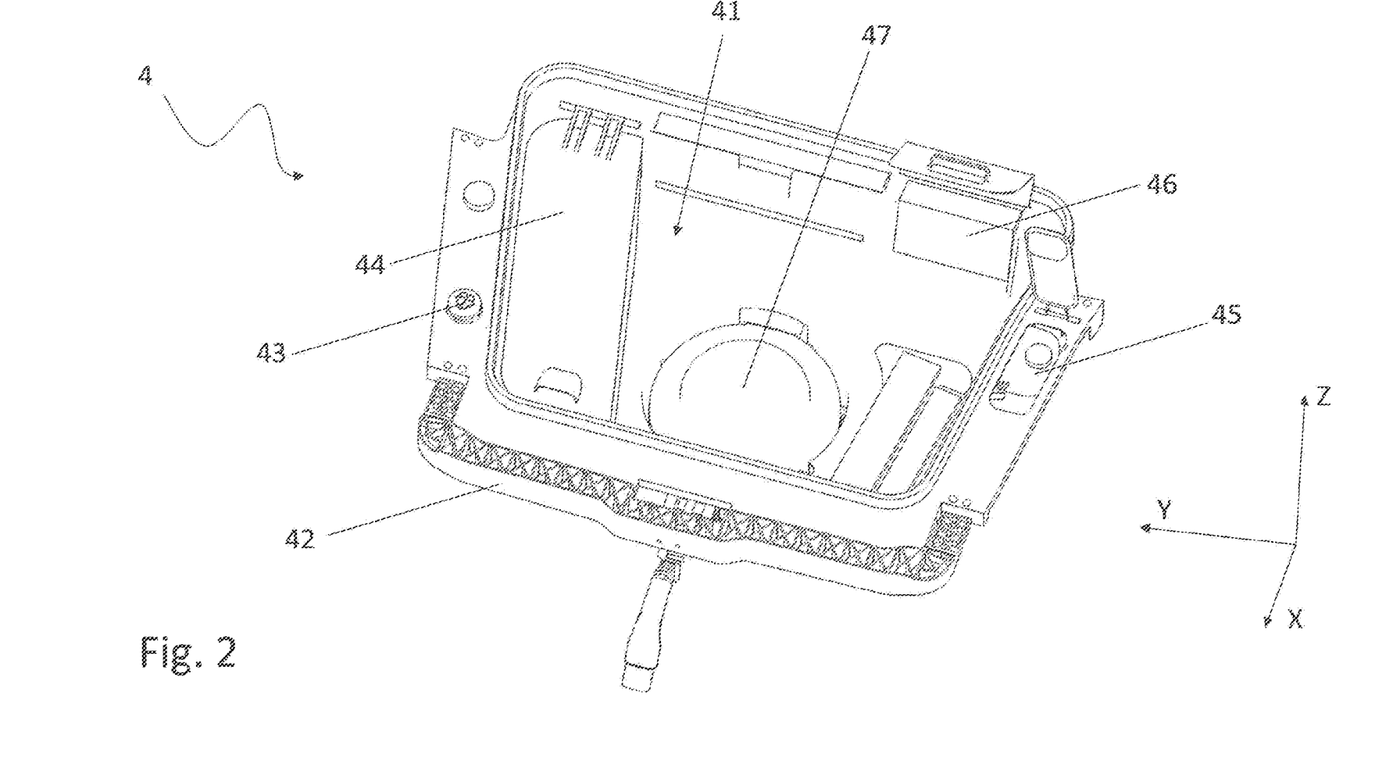
FIG. 2 is a perspective view from above of a vehicle front module.

The vehicle front module 4 shown in FIG. 2 consists substantially of a loading compartment cavity 41 which has an opening, a base and a wall arranged between the opening and the base. In the embodiment shown here, a charging connection element 47 is arranged centrally on the base. On the left next to the charging connection element 47, a cooler 44 is arranged directly on the outer wall of the loading compartment cavity 41. In addition to the cooler 44, on the outside of the wall of the loading compartment cavity 41, media containers are arranged, wherein the closure 43 of the media container indicates windshield washer fluid. A compartment 46 is arranged in the rear wall of the storage cavity 41, which compartment can preferably be used for accommodating a bandage box. A further media container 45 is arranged on the right on the outer side of the side wall. The container for brake fluid can preferably be arranged here. Depending on requirements and convenience, other media containers 43, 45 or another arrangement of the media containers 43, 45 is also conceivable. The illustrated loading compartment cavity 41 has a reinforcement structure 42 in the front region seen in the drive direction X, which is simultaneously used as a front lock carrier for the hood 2 (see FIG. 1). The reinforcement structure 42 has a honeycomb structure which stiffens the region of the storage cavity 41 in such a way that the element can absorb a large amount of energy during deformation.

Figure 3:
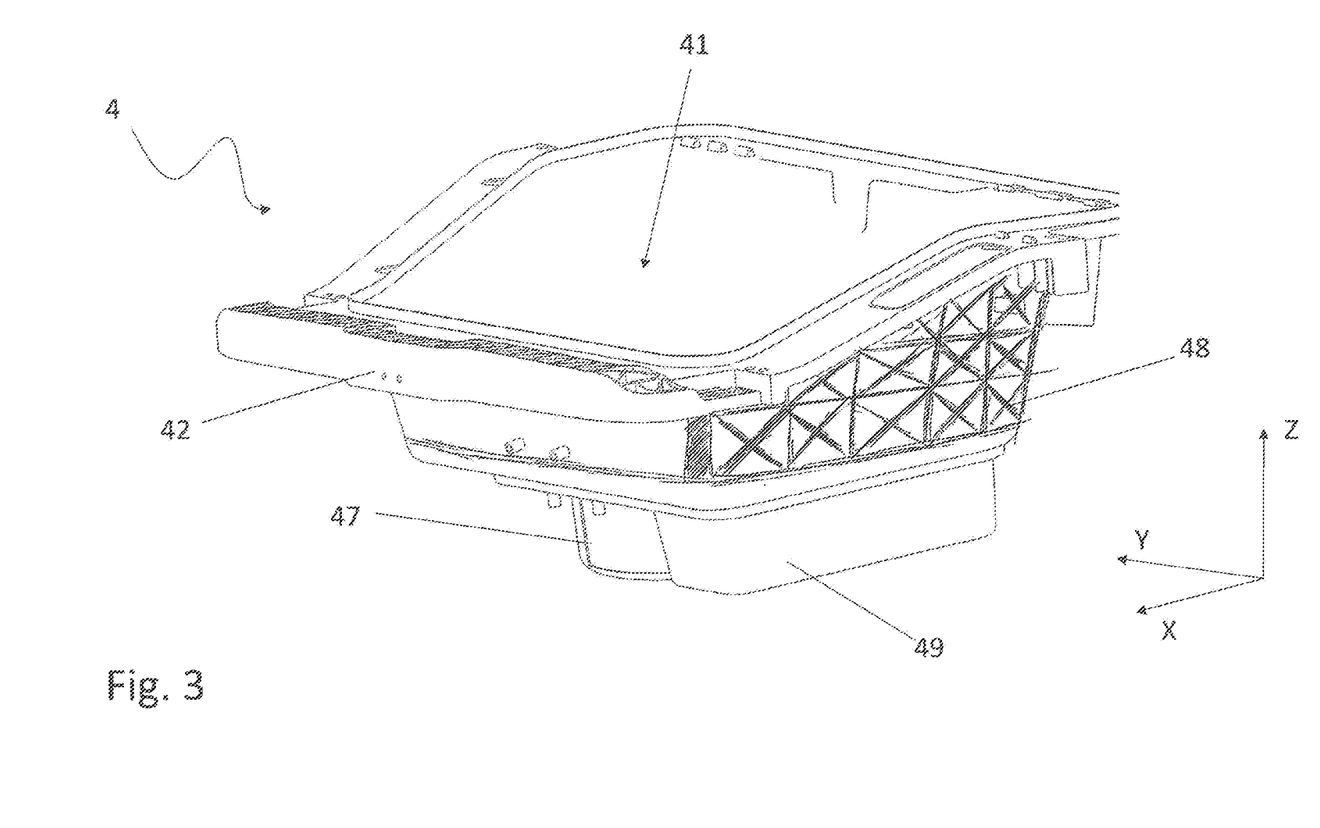
FIG. 3 is a second embodiment of a vehicle front module obliquely from the front.

The second embodiment of a vehicle front module 4 shown in FIG. 3 also has a second, lateral reinforcement structure 48 in addition to the front reinforcement structure 42. In the base region of the loading compartment cavity 1, a storage trough 49 is arranged on the right next to the charging connection element 47, which storage trough is preferably used for accommodating a car jack and/or for accommodating a tool.

Figure 4:
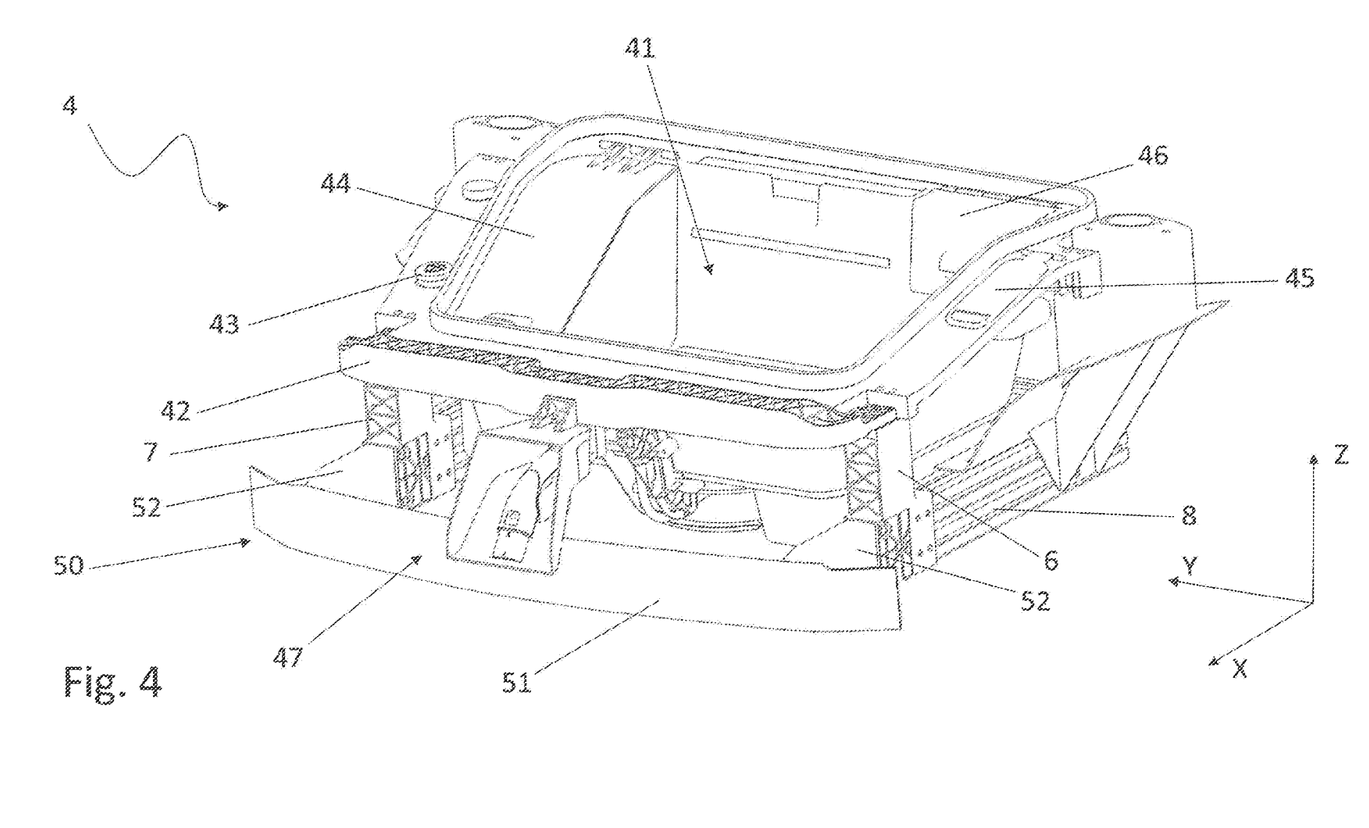
FIG. 4 is a further embodiment of a vehicle front module.

The embodiment of a vehicle front module 4 according to the invention shown in FIG. 4 represents the loading compartment cavity 41 with the media containers 43, 45, the cooler 44, and the compartment 46 described above. Lateral beams 6, 7 are arranged on the ends of the front reinforcement structure 42, and are supported on the longitudinal beams 8 at the lower end. The bumper 50, here consisting of the impact element 51 and the two crash boxes 52, is arranged on the longitudinal beams 8. A holder which supports the plug at the end of the charging connection element 47 when it is in the standby position is arranged centrally above the impact element 51.

Figure 5:
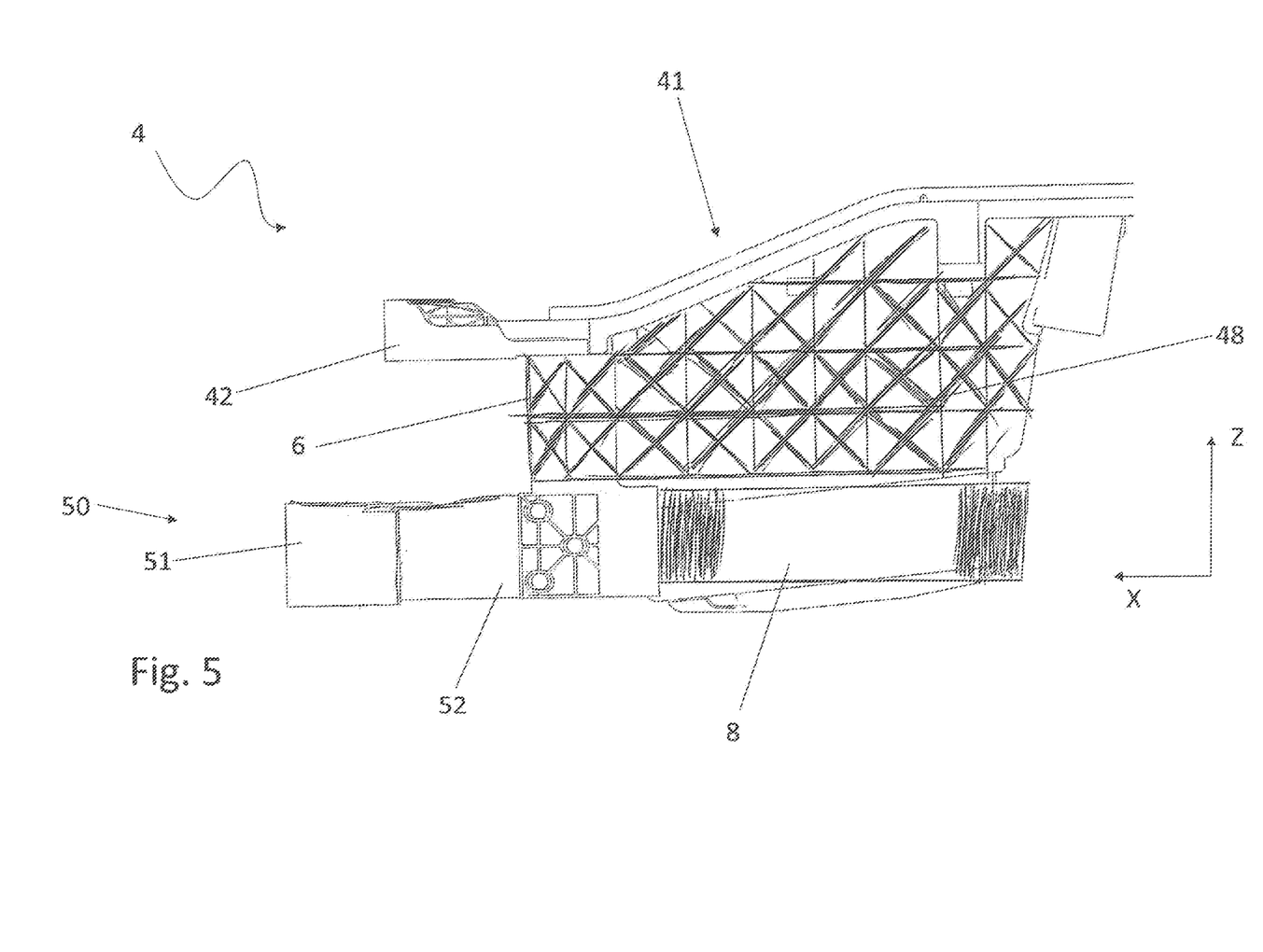
FIG. 5 is a third embodiment in a side view of a vehicle front module.

FIG. 5 is a third embodiment in side view of a vehicle front module 4, wherein the loading compartment cavity 41 is provided with a front reinforcement structure 42 and a lateral reinforcement structure 48. The two reinforcement structures 42, 48 are connected to one another via the lateral beam 6. The ensemble 41, 42, 48, 6 is connected to the longitudinal beam 8, wherein the bumper 50 is arranged at the front on the longitudinal beam 8, wherein the crash box 52, which is arranged on the end face of the longitudinal beam 8, carries the impact element 51.

Figure 6:
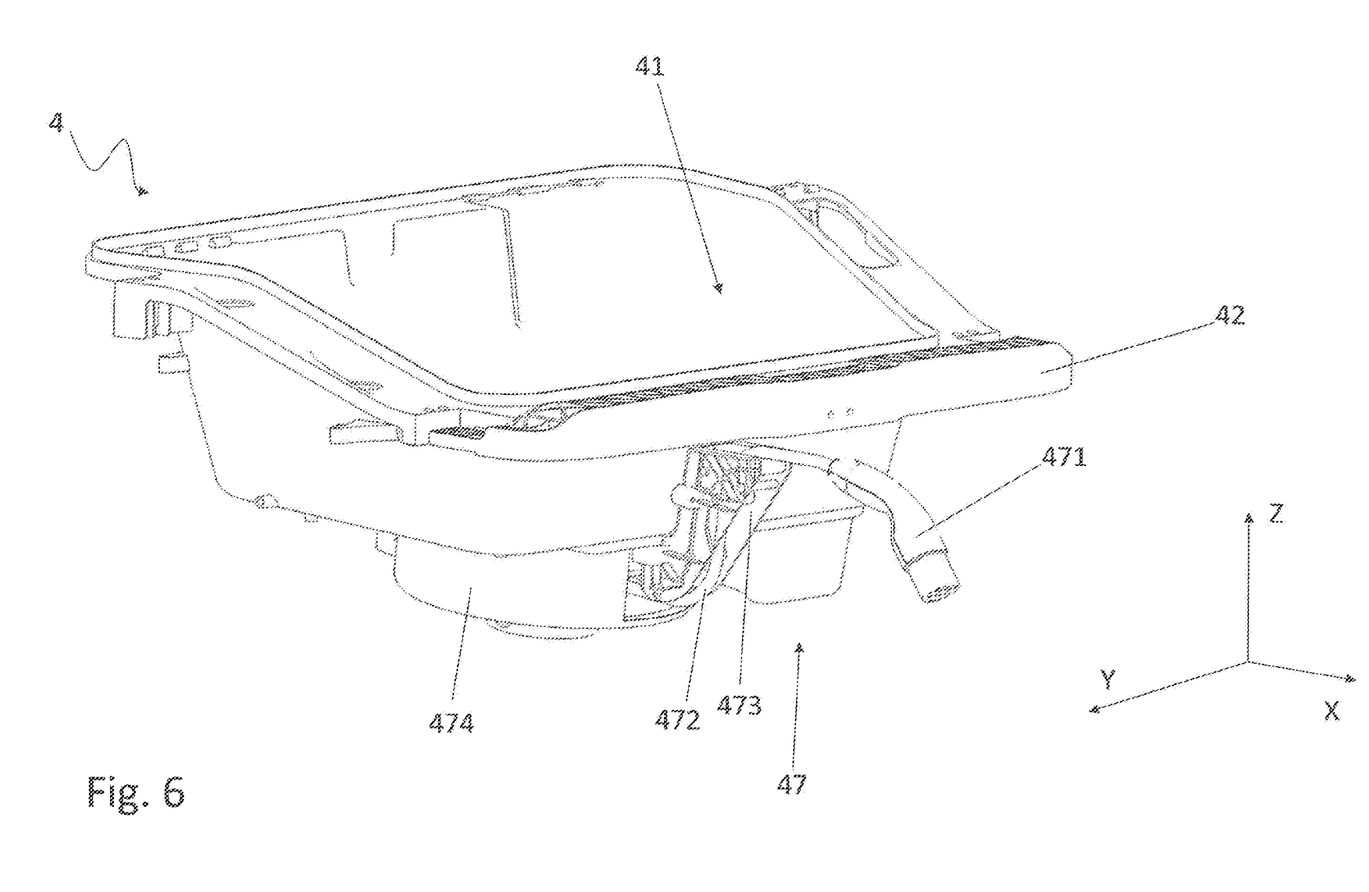
FIG. 6 is a fourth embodiment of a vehicle front module obliquely from the front.
Figure 7:
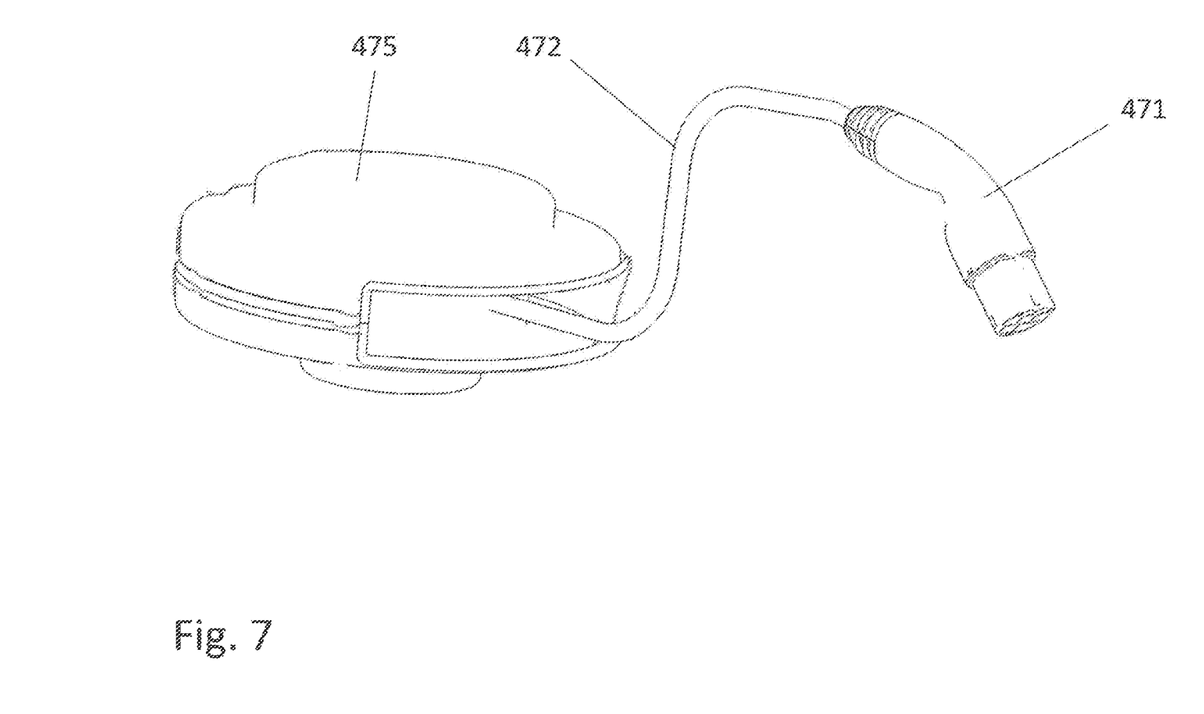
FIG. 7 is a charging connection element.

FIG. 6 is a fourth embodiment of a vehicle front module 4 shown obliquely from the front, wherein the loading compartment cavity 41 is shown with a front reinforcement structure 42 arranged thereon. A cable drum container 474, in which a cable drum 475 is located (not shown here), is arranged on the base of the loading compartment cavity 41. The charging cable 471, 472 is guided forward via a charging cable guide 473, where the plug of the charging cable 471 is held in the upper part for a charging procedure. This arrangement of charging cable 471, 472 and cable drum 475 is shown in FIG. 7.

Figure 8:
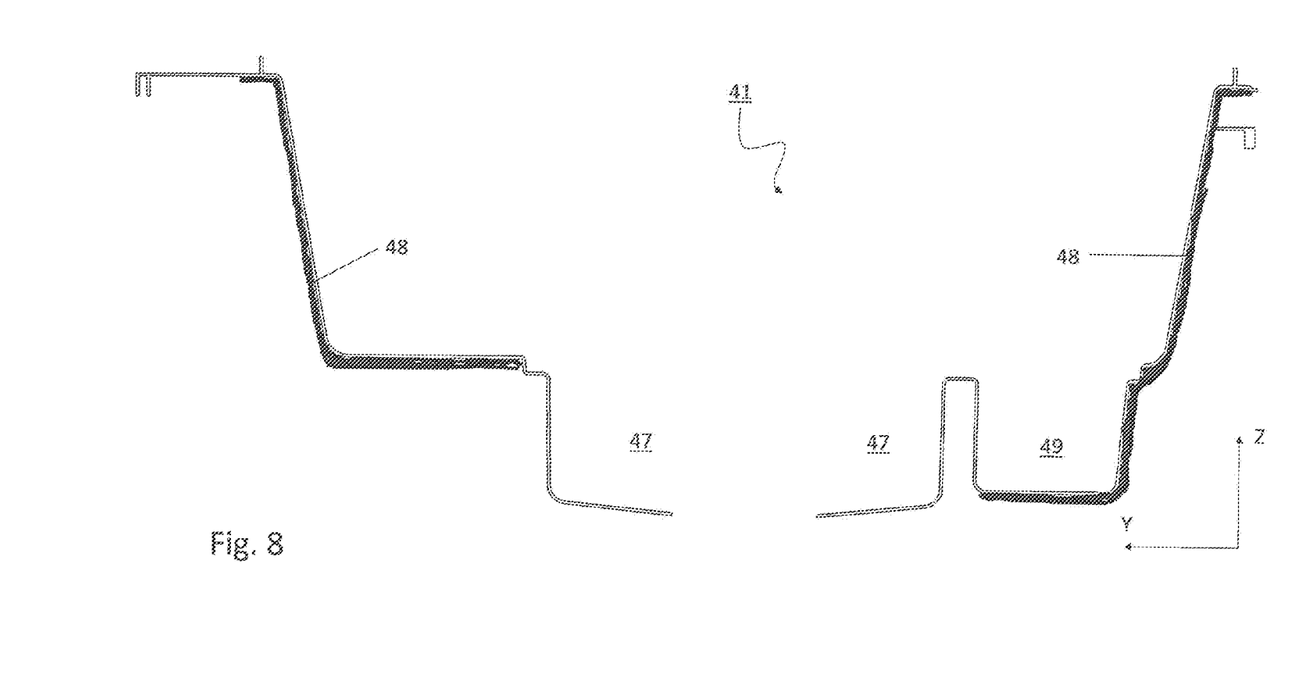
FIG. 8 is a section through a loading compartment cavity.

FIG. 8 is a section transverse (Y direction) through a loading compartment cavity 41. The section shows the upwardly open loading compartment cavity 41 with a base in which a receptacle for a charging connection element 47 and a storage trough 49 for accommodating a car jack and/or tool are provided. The side walls of the loading compartment cavity 41 have reinforcement structures 48 which greatly stiffen the loading compartment cavity 41. In the event of an impact, the loading compartment cavity 41, and thus the vehicle front module 4, can absorb part of the energy by deformation, and thus make a contribution to the safety of the occupants of the vehicle 1 in which the vehicle front module 4 is installed.

Furthermore, a possible installation of a cable drum with a charging cable offers an option that can make the charging of the electric vehicle more flexible and thereby easier.

The invention claimed is:

1. A vehicle front module (4), comprising a loading compartment cavity (41) with a receiving area for loading objects, wherein the loading compartment cavity (41) has an opening, a base, and a wall arranged between the opening and the base, wherein a front reinforcement structure (42) which extends in a transverse direction (Y) transversely to a drive direction (X) is molded on the loading compartment cavity (41), on a face of the loading compartment cavity (41) positioned at the front in the drive direction (X), wherein the wall additionally has at least one lateral reinforcement structure (48), which is connected to the wall or is molded thereon and which differs from the front reinforcement structure (42), at least on the faces of the loading compartment cavity (41) lying opposite one another in the transverse direction (Y) and in that the lateral reinforcement structure (48) extends over a significant part of the portions of the wall of the loading compartment cavity (41) lying opposite one another in the transverse direction (Y), wherein the front reinforcement structure (41) is designed as a cross member of a mounting support, wherein a front portion of the lateral reinforcement structure (48) in the drive direction (X) is designed as a lateral beam (6, 7) of the mounting support and is connected to the front reinforcement structure (42), wherein the front portion of the lateral reinforcement structure (48), which is formed as the lateral beam (6, 7), is connected to the lateral reinforcement structure (48) below the front reinforcement structure (42) as viewed in a vertical direction (Z) via crash boxes (52).

2. The vehicle front module (4) according to claim 1, further comprising a cooler device.

3. The vehicle front module (4) according to claim 1, wherein the loading compartment cavity (41) is formed from a plastics material.

4. The vehicle front module (4) according to claim 3, wherein the plastics material is structurally reinforced with metallic elements.

5. The vehicle front module (4) according to claim 4, wherein the metallic elements are connected to the plastics material of the loading compartment cavity (41) by injection molding or are subsequently installed on the loading compartment cavity (41).

6. A vehicle (1) comprising a vehicle structure (7) and a vehicle front module (4), which is connected to the vehicle structure (7), according to claim 1.

7. The vehicle front module (4) according to claim 3, wherein the plastics material is filled with glass fibers or continuous glass fibers.

8. The vehicle front module (4) according to claim 7, wherein the plastics material is structurally reinforced with embedded sheets of metallic elements.

9. The vehicle front module (4) according to claim 8, wherein the metallic elements are connected to the plastics material of the loading compartment cavity (41) by injection molding through or around the metallic elements.

10. A vehicle front module (4), comprising a loading compartment cavity (41) with a receiving area for loading objects, wherein the loading compartment cavity (41) has an opening, a base, and a wall arranged between the opening and the base, wherein a front reinforcement structure (42) which extends in a transverse direction (Y) transversely to a drive direction (X) is molded on the loading compartment cavity (41), on a face of the loading compartment cavity (41) positioned at the front in the drive direction (X), wherein the wall additionally has at least one lateral reinforcement structure (48), which is connected to the wall or is molded thereon and which differs from the front reinforcement structure (42), at least on the faces of the loading compartment cavity (41) lying opposite one another in the transverse direction (Y) and in that the lateral reinforcement structure (48) extends over a significant part of the portions of the wall of the loading compartment cavity (41) lying opposite one another in the transverse direction (Y), wherein the loading compartment cavity (41) additionally has a receiving area for loading objects, wherein a cable drum (475) with a charging cable (472, 471) that can be wound thereon is arranged in the base region of the loading compartment cavity (41), and further comprising a charging cable guide (473) which is arranged at least partially on the front side of the loading compartment cavity (41) in the drive direction (X), and by means of which the charging cable (471, 472) is guided from the base region of the loading compartment cavity (41) to the front side of the loading compartment cavity (41) in the drive direction (X).

11. A vehicle (1) comprising a vehicle structure (7) and a vehicle front module (4), which is connected to the vehicle structure (7), according to claim 10.

12. The vehicle front module (4) according to claim 10, wherein the front reinforcement structure (41) is designed as a cross member of a mounting support.

13. The vehicle front module (4) according to claim 12, wherein a front portion of the lateral reinforcement structure (48) in the drive direction (X) is designed as a lateral beam (6, 7) of a mounting support and is connected to the front reinforcement structure (42).

14. The vehicle front module according to claim 13, wherein the front portion of the lateral reinforcement structure (48), which is formed as the lateral beam (6, 7), is connected to the lateral reinforcement structure (48) below the front reinforcement structure (42) as viewed in the vertical direction (Z) via crash boxes (52).

\* \* \* \* \*